United States Patent
Lee et al.

(10) Patent No.: US 6,597,828 B2
(45) Date of Patent: Jul. 22, 2003

(54) OPTICAL SWITCH

(75) Inventors: Hsiao-Wen Lee, Hsinchu (TW); Li-Ding Wei, Taipei (TW); Shih-Yi Wen, Taipei (TW); Chieh Hu, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/038,904

(22) Filed: Jan. 8, 2002

(65) Prior Publication Data

US 2003/0077028 A1 Apr. 24, 2003

(30) Foreign Application Priority Data

Oct. 18, 2001 (TW) .................................. 90125761 A

(51) Int. Cl.[7] .................................................. G02B 6/26
(52) U.S. Cl. .............................. 385/18; 385/16; 385/17
(58) Field of Search ...................................... 385/16–24

(56) References Cited

U.S. PATENT DOCUMENTS 5,960,132 A * 9/1999 Lin ............................ 385/18
6,256,430 B1 * 7/2001 Jin et al. ..................... 385/18
6,498,870 B1 * 12/2002 Wu et al. .................... 385/18

OTHER PUBLICATIONS

Lee et al. Free–Space Fiber–Optic Switches Based on MEMS Vertical Torsion Mirrors, Journal of Lightwave Technology. vol. 17, No. 1, Jan. 1999.

Toshiyoshi et al, Electromagnetic Torsion Mirrors for Self--Aligned Fiber–Optic Crossconnectors by Silicon Mictomachining, IEEE Journal of Selected Topics in Quantum Electronics, vol. 5, No. 1, Jan./Feb. 1999.

* cited by examiner

Primary Examiner—Phan T. H. Palmer
(74) Attorney, Agent, or Firm—Birch, Stewart, Kolasch & Birch, LLP

(57) ABSTRACT

An optical switch is disclosed. A lock magnetic field is provided on the sides of a rotator with a magnetic surface. The magnetic field has a potential with two minima as reflective and non-reflective positions. At the reflective position, the reflective mirror on the rotator reflects light beams. The beam goes through when the rotator is at the non-reflective position. At the same time, the magnetic field firmly locks the rotator at its position. When a driving force is imposed on the rotator; it rotates from its current position to the other position and gets locked at the new position.

12 Claims, 12 Drawing Sheets

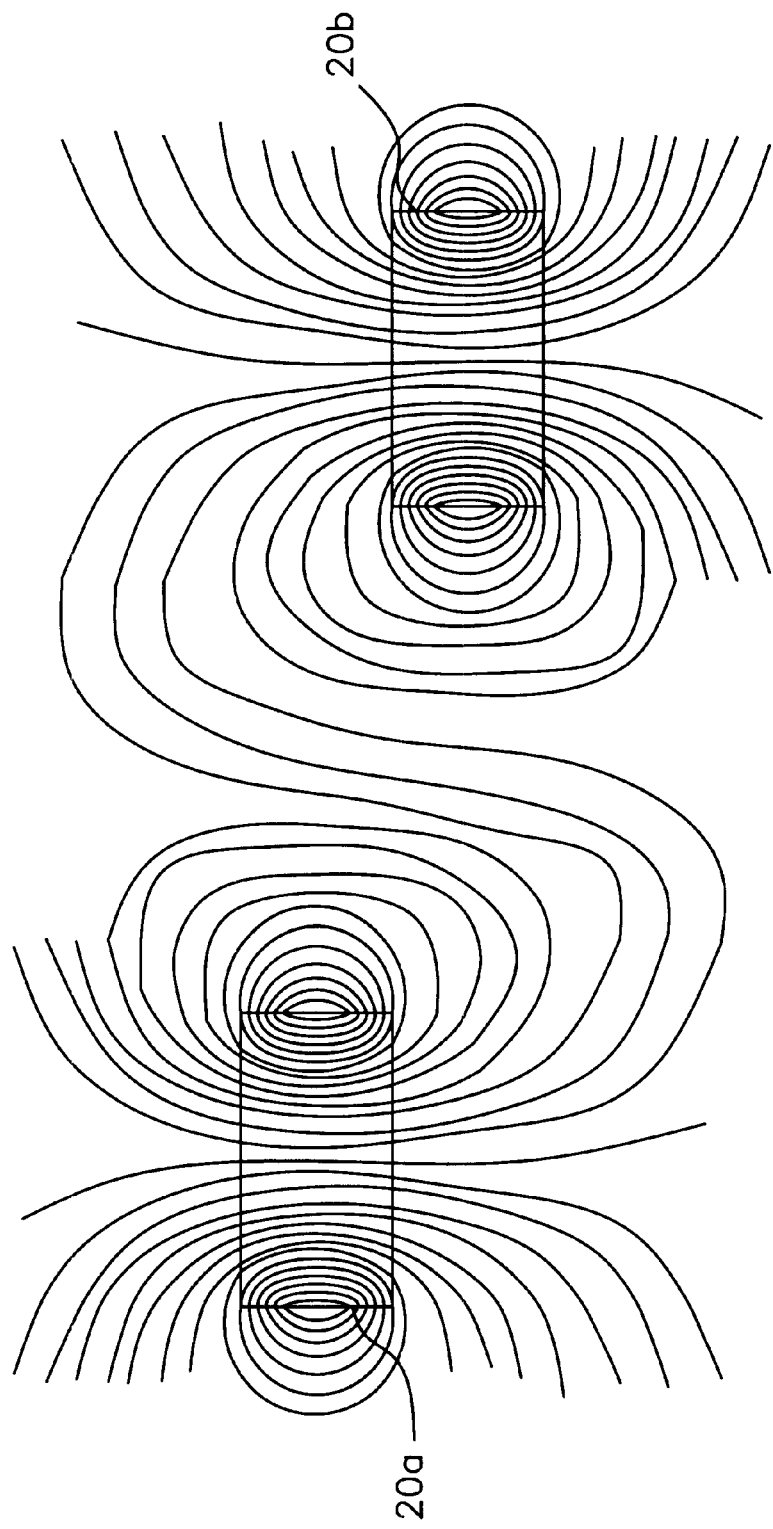

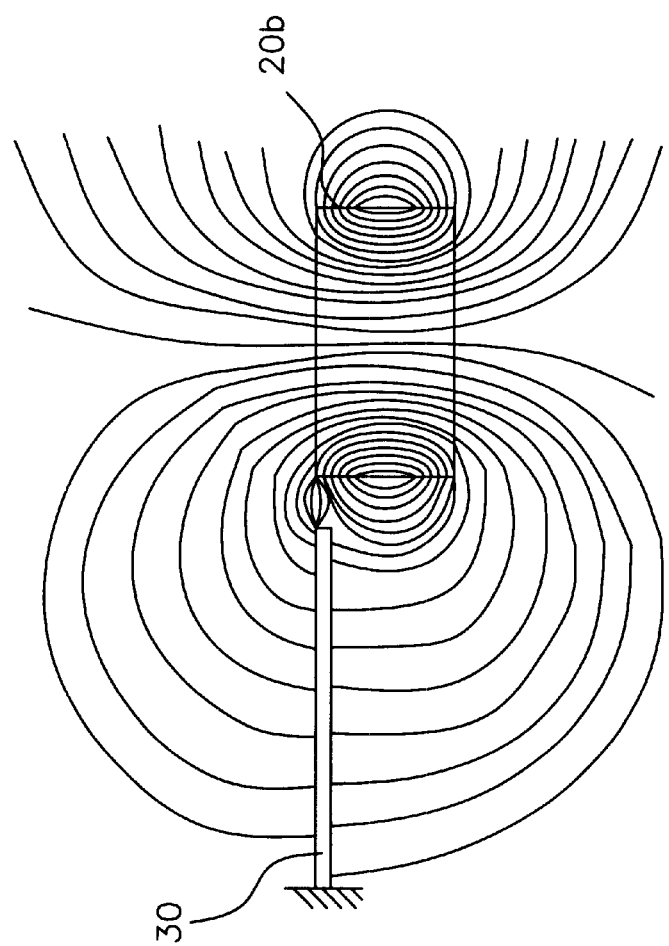

OPTICAL SWITCH

BACKGROUND OF THE INVENTION

1. Field of Invention

The invention relates to an optical switch to control the traveling direction of a beam. In particular, the invention relates to an optical switch that uses a magnetic field to lock the switch.

2. Related Art

In general, the optical switch is used to control the traveling direction of a beam. The on-and-off of the switch determines whether a beam is allowed to reach a certain place. Therefore, the optical switch can selectively make a traveling beam reflect from a first traveling direction to a second traveling direction or continue traveling along the first traveling direction. The main method of reflecting a beam using the optical switch is to employ a reflective mirror to reflect the light. In recent years, the optical switch is evolved from normal sizes down to one that utilizes the micro-electro-mechanical system (MEMS) manufacturing technology, achieving the goal of minimizing optical switches. Another important direction is to make a large matrix of optical switches.

An optical switch matrix comprised of four optical switches is shown in FIG. 1. Light beams L1, L2 propagate in a first traveling direction along fiber optic cables 1a, 1b. After leaving the fiber optic cables 1a, 1b, they still travel in the same direction until they hit a mirror 4 and get reflected into a second traveling direction. Afterwards, the beams follow the fiber optic cables 2a, 2b to continue their courses. Of course, when the light beams L1, L2 are not reflected by the mirror 4 to the second traveling direction, they can keep going in the first traveling direction and propagate to fiber optic cables 3a, 3b.

The mechanism that switches the mirror 4 between the reflective position and the non-reflective position can use electrostatic force to generate a minute torque on the mirror, see JOURNAL OF LIGHTWAVE TECHNOLOGY, VOL. 17, NO. 1, JANUARY 1999 ("Free-Space Fiber-Optic Switches Based on MEMS Vertical Torsion Mirrors"). However, this switching method requires continuous power consumption to keep the mirror at the reflective position. Furthermore, since a torsion generated by the electrostatic force is used to switch the rotator between the reflective position and the non-reflective position, the lifetime of the device may not be predictable due to unexpected machine fatigue.

Another method that uses a magnetic force as the driving force is proposed in IEEE JOURNAL OF SELECTED TOPICS IN QUANTUM ELECTRONICS, VOL. 5, NO. 1, JANUARY/FEBRUARY 1999 ("Electromagnetic Torsion Mirrors for Self-Aligned Fiber Optic Crossconnectors by Silicon Micromachining"). This device mainly includes a magnet, a coil, a substrate, and a mirror. The magnet is installed on the substrate under the rotatable mirror. It has the function of locking the mirror at a specific position. As the mirror is coated with a magnetic material, the mirror will rotate by 90 degrees to a perpendicular position once the coil is imposed with a current. Therefore, this device can be used as an optical switch. Nevertheless, this method has the following drawbacks:

1. A larger magnetic field is needed in order to rotate the mirror by 90 degrees.
2. The mirror is susceptible to external disturbance and vibrates or even deviates from its locking position, resulting in noisy light signals.
3. Since the mirror rotates 90 degrees, the torsional bar has to be elongated to avoid limit stress tension, thus increasing the total area.

In view of the foregoing, it is highly preferable to provide an optical switch with a stable locking function and satisfying the need for a large optical matrix. It is further desirable to minimize the optical switch to save energy.

SUMMARY OF THE INVENTION

An objective of the invention is to provide an optical switch which has a reflective position and a non-reflective position for the optical switch by establishing a stable magnetic field having a potential with two minima. When the provided driving force conquers the potential and drives the optical switch to the other potential minimum, the optical switch is automatically locked at the other position even after the driving force is removed. This invention can achieve the goals of increasing lifetime, enhancing dynamical properties, and stabilizing the locking while minimizing power consumption.

In accordance with the disclosed optical switch, a beam can be selectively reflected or allowed to pass. It has a substrate, two magnetic objects, a rotator, and a driving device. The two magnetic objects are installed on both surfaces of the substrate for providing a magnetic field. The driving device is pivotally installed between the two magnetic objects on the substrate and has a mirror and a magnetic material. Under the magnetic field of the magnetic objects, the rotator can be selectively and firmly locked at a reflective position to reflect beams and a non-reflective position for the beam to pass. The driving device is installed close to one surface of the substrate corresponding to the rotator to provide a driving force to switch the rotator between the reflective position and the non-reflective position.

Therefore, when the rotator is at the reflective position, the mirror on the rotator can reflect the beam. If the driving device now provides a driving force to rotate the rotator to the non-reflective position, the beam is then allowed to keep traveling without reflection. On the contrary, if the driving device provides a driving force to rotate the rotator from the non-reflective position to the reflection position, the beam is then reflected to travel in another direction.

BRIEF DESCRIPTION OF THE DRAWINGS

The invention will become more fully understood from the detailed description given hereinbelow illustration only, and thus are not limitative of the present invention, and wherein:

FIG. 3 shows the magnetic fields of two magnetic objects;

FIGS. 6A and 6B show the interactions between the magnetic objects and the locking magnetic field when the rotator is at the reflective and non-reflective positions, respectively.

DETAILED DESCRIPTION OF THE INVENTION

The optical switch in the invention can be a micro optical switch or a normal size optical switch according to practical purposes.

Figure 1:
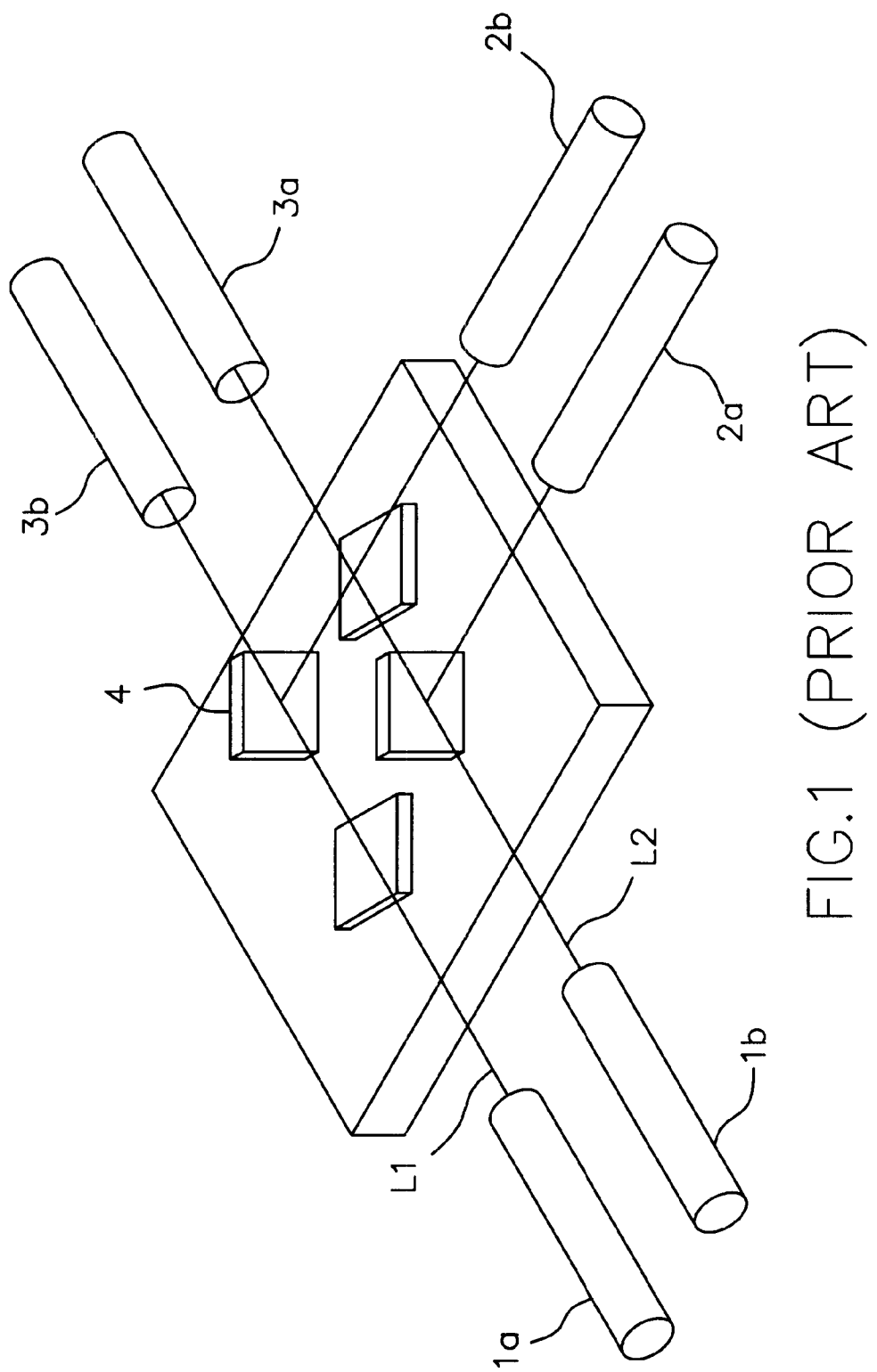
FIG. 1 is a schematic view showing a conventional optical switch that reflects and passes light beams.
Figure 2A:
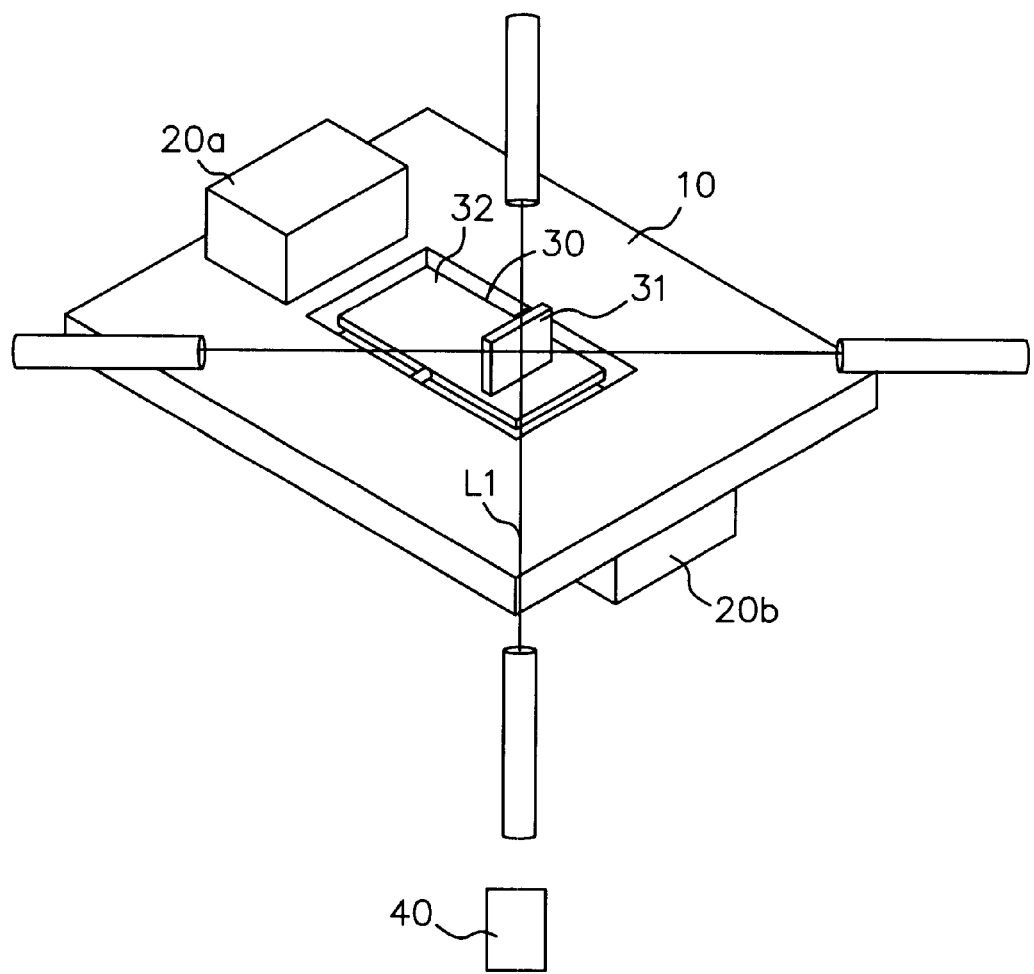
FIGS. 2A and 2B are three-dimensional views showing two positions of the rotator of the invention.
Figure 2B:
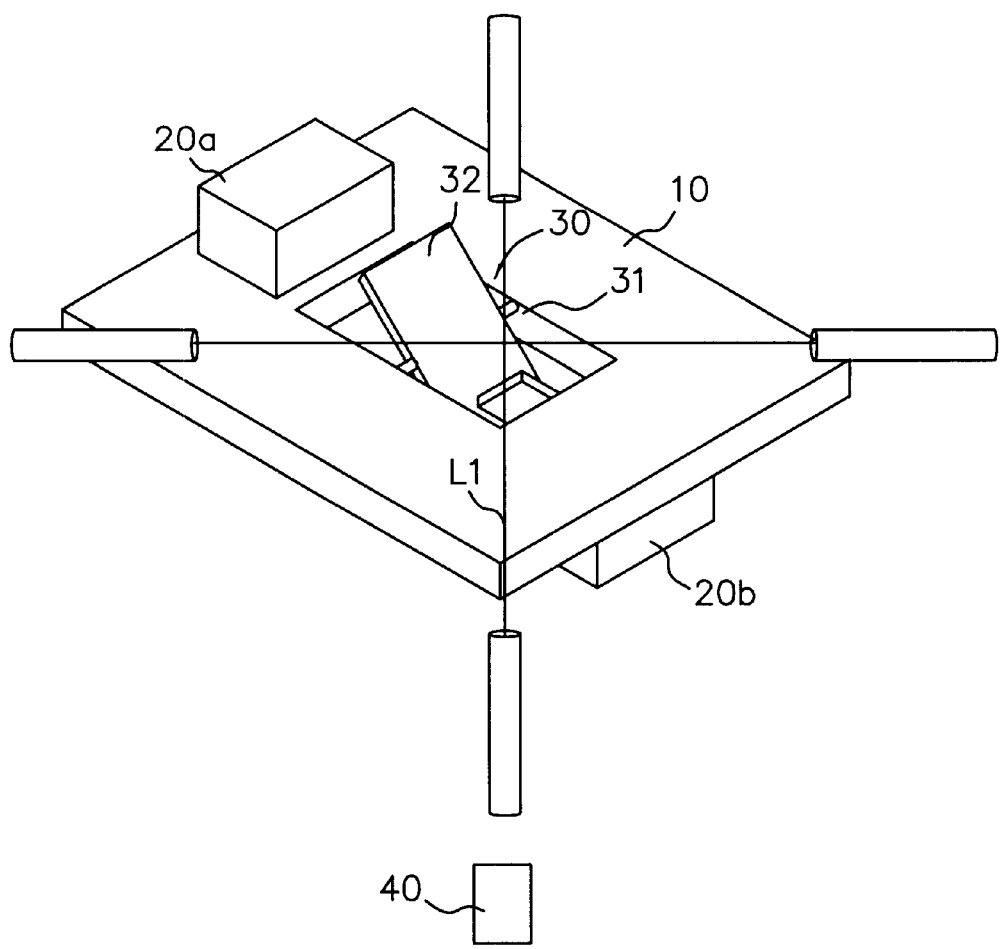

As shown in FIGS. 2A and 2B, the disclosed optical switch can selectively reflect a beam L1 or allow it to pass through. It contains a substrate 10, magnetic objects 20a, 20b, a rotator 30 and a driving device 40.

The magnetic objects 20a, 20b are installed on both surfaces of the substrate 10 by pasting, electroplating, spin coating and etching, or half-tone printing to provide a magnetic field. The magnetic objects in this embodiment are magnets. However, other magnetic objects can be used.

The rotator 30 is a torsional design pivotally installed between the two magnetic objects 20a, 20b on the substrate 10. Therefore, it can shorten the distance between the magnetic objects 20a, 20b and the rotator 30. The rotator 30 also has a mirror 31 and a magnetic material 32 coated on its surface by pasting, electroplating, spin coating and etching, or half-tone printing. Under the interactions with the magnetic field provided by the magnetic objects 20a, 20b, two stable locking positions in the magnetic field can be formed, corresponding to a reflective position to reflect a beam L1 (FIG. 2A) and a non-reflective position allowing the beam L1 to pass (FIG. 2B).

The driving device 40 is installed close one surface (the lower surface in the drawing) of the substrate 10 corresponding to the rotator 30 to provide the driving force switching the rotator 30 between the reflective position and the non-reflective position. The driving device 40 in this drawing is a coil. When a current is imposed on the coil, the magnetic force thus generated rotates the rotator 30.

Figure 4A:
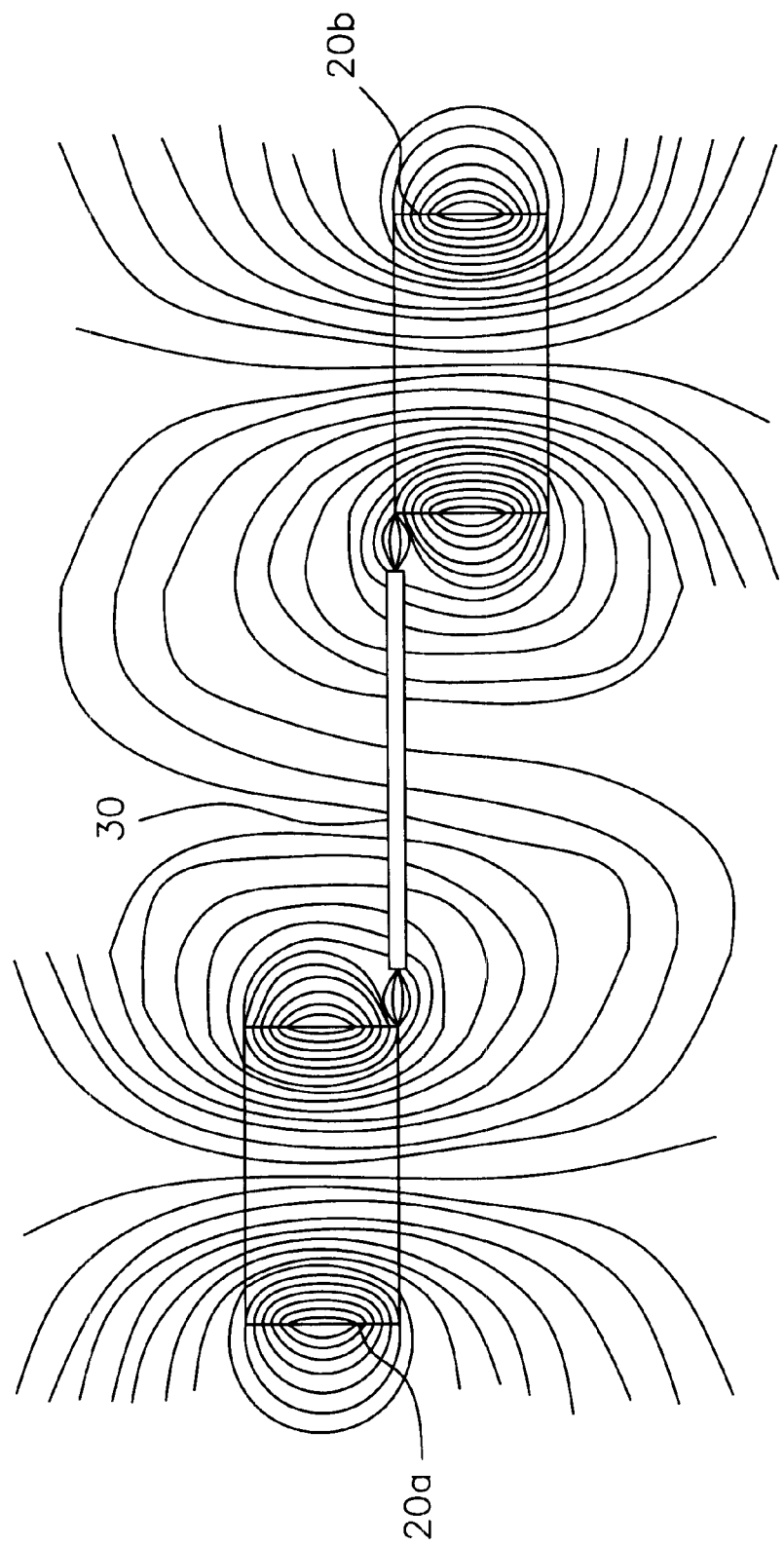
FIGS. 4A and 4B show magnetic fields between two magnetic objects when the rotator is at the reflective and non-reflective positions, respectively.
Figure 4B:
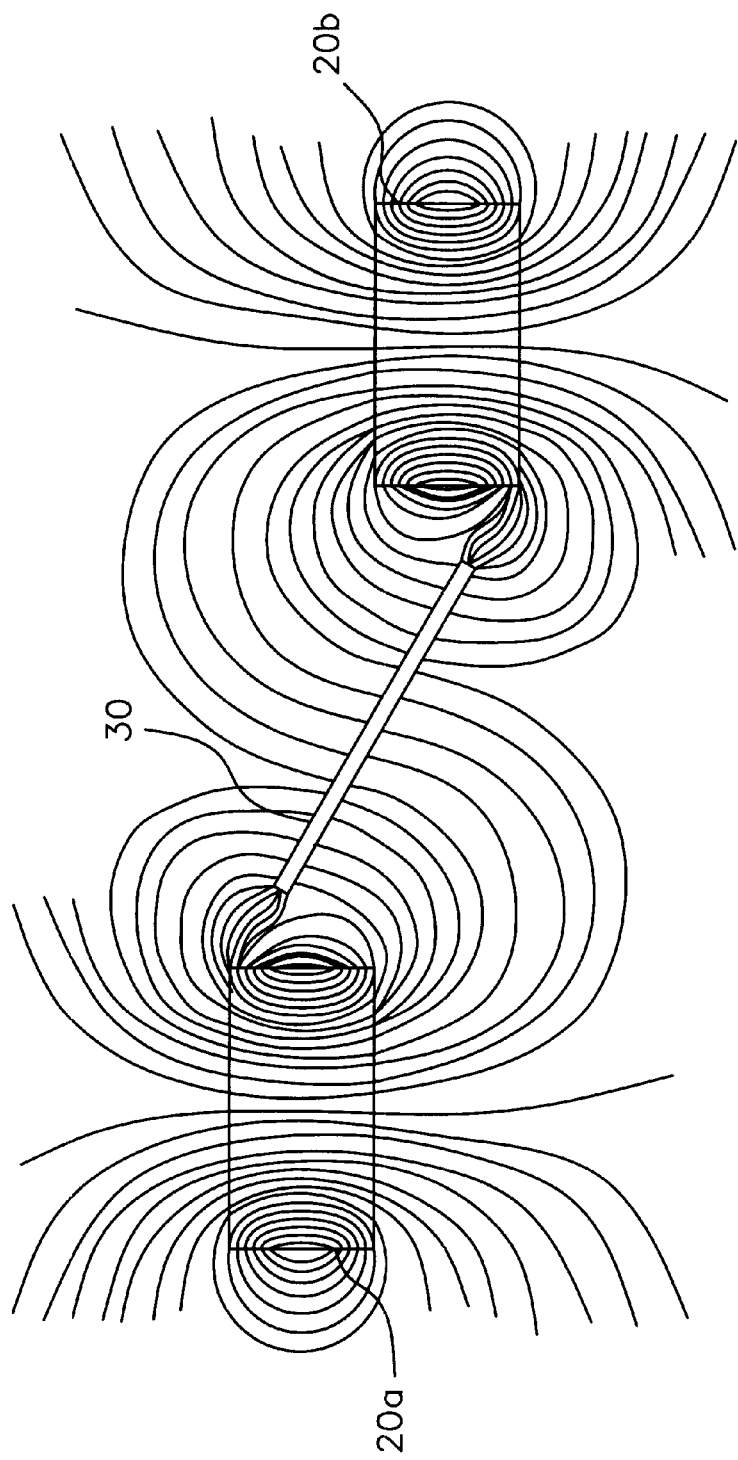

With other surrounding magnetic objects, the magnetic objects 20a, 20b has a magnetic field as shown in FIG. 3. When the rotator 30 coated with a magnetic material 32 is placed between the magnetic objects 20a, 20b, there are two positions in the magnetic field for the rotator to stay stably. That is, there are two potential wells as shown in FIGS. 4A and 4B. Thus, one can obtain the reflective and the non-reflective positions of the rotator 30 by this method. Furthermore, installing the two magnetic objects 20a, 20b on both sides of the rotator 30 can increase the driving force from the driving device 40 on the rotator 30 through push-pull. Therefore, the rotator 30 can be quickly and smoothly locked at either the reflective position or the non-reflective position, without overshooting (oscillations). This can increase the dynamical properties, shorten the switch time and the microstructure operating time. After the driving force is removed, the rotator 30 can be firmly locked at the current position.

As shown in FIGS. 2A and 2B, when the rotator 30 is at the reflective position, the mirror 31 on the rotator 30 can reflect the beam L1. If the driving device 40 now provides a driving force to rotate the rotator 30 to the non-reflective position, the beam L1 is then allowed to keep traveling without reflection. On the contrary, if the driving device 40 provides a driving force to rotate the rotator 30 from the non-reflective position to the reflection position, the beam L1 is then reflected to travel in another direction.

Figure 5A:
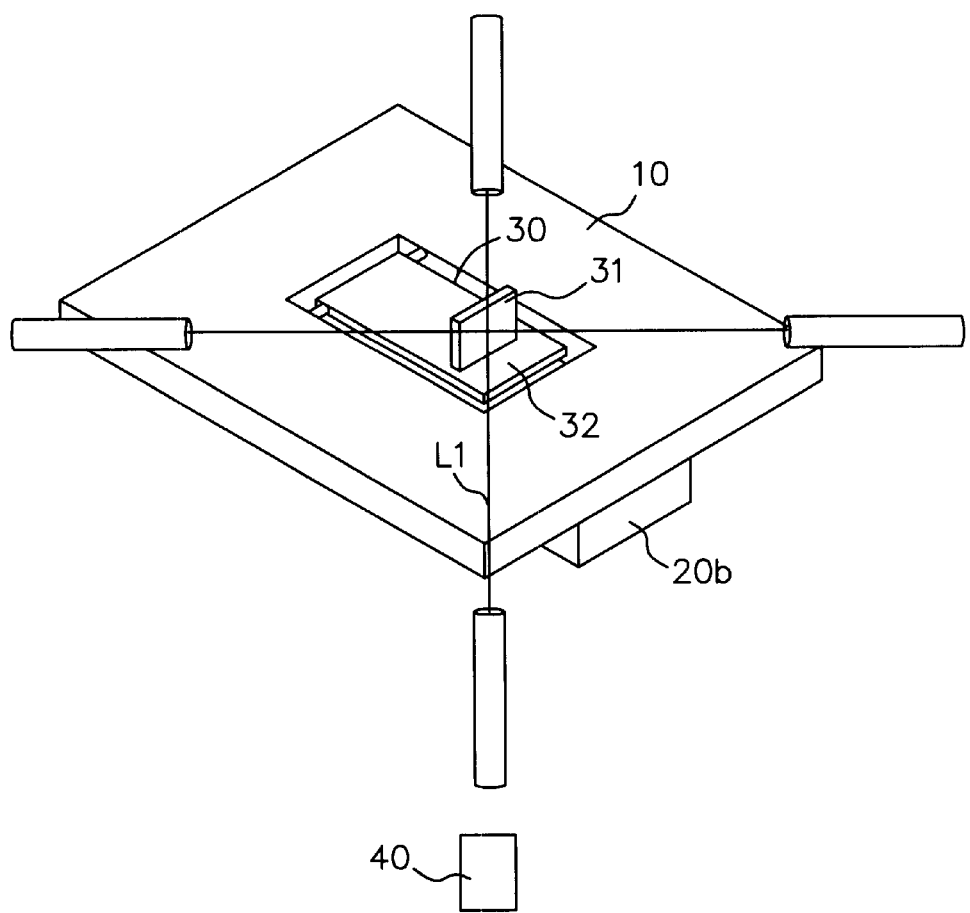
FIGS. 5A and 5B are three-dimensional views showing two positions of the rotator in another embodiment of the invention.
Figure 5B:
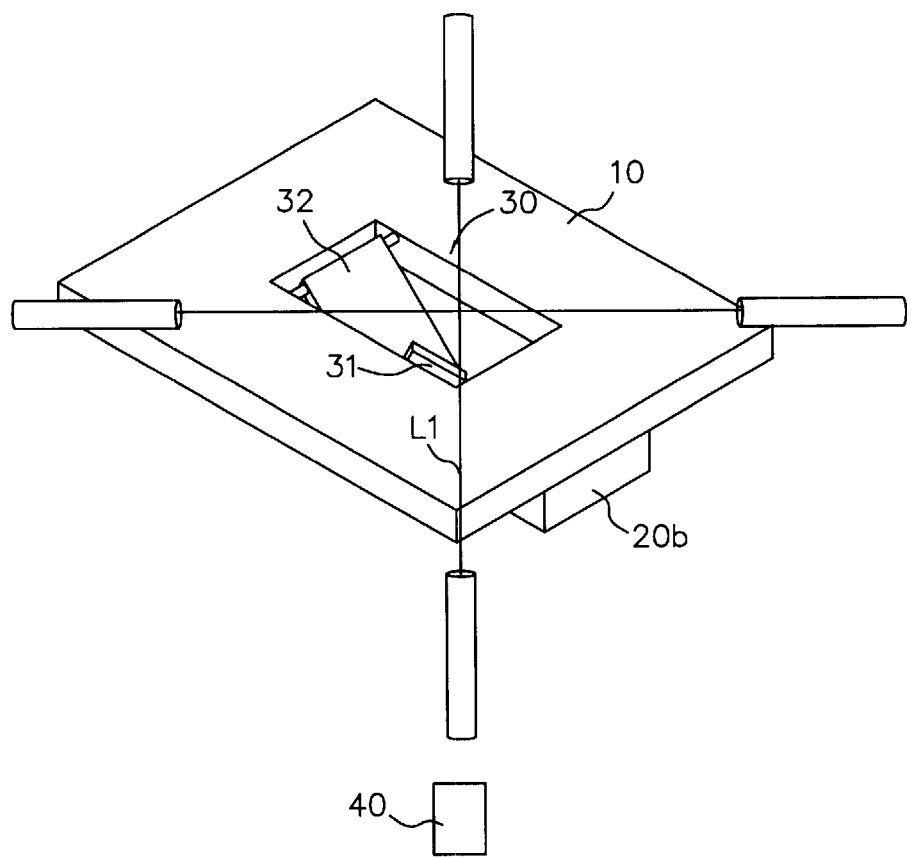

With reference to FIGS. 5A and 5B, another embodiment of the invention also allows selectively reflecting or passing a beam L1. This configuration contains a substrate 10, a magnetic object 20b, a rotator 30 and a driving device 40.

The magnetic object 20 is installed on the back of the substrate 10 by pasting, electroplating, spin coating and etching, or half-tone printing to provide a magnetic field. The magnetic object in the drawing is a magnet, but can be any other magnetic object.

The rotator 30 has a suspended arm design, pivotally installed close to the substrate 10 corresponding to the magnetic object 20b, minimizing the distance between the magnetic object 20b and the rotator 30. It further has a mirror 31, and its surface is formed with a magnetic material by pasting, electroplating, spin coating and etching, or half-tone printing. Under the interactions with the magnetic field produced by the magnetic object 20b, there exist two stable potential wells as locking positions, corresponding to a reflective position to reflect the beam L1 (FIG. 5A) and a non-reflective position allowing the beam L1 to pass (FIG. 5B).

The driving device 40 is installed close one surface (the lower surface in the drawing) of the substrate 10 corresponding to the rotator 30 to provide the driving force switching the rotator 30 between the reflective position and the non-reflective position. The driving device 40 in this drawing is a coil. When a current is imposed on the coil, the magnetic force thus generated rotates the rotator 30.

As shown in FIGS. 5A and 5B, when the rotator 30 is at the reflective position, the mirror 31 on the rotator 30 can reflect the beam L1. If the driving device 40 now provides a driving force to rotate the rotator 30 to the non-reflective position, the beam L1 is then allowed to keep traveling without reflection. On the contrary, if the driving device 40 provides a driving force to rotate the rotator 30 from the non-reflective position to the reflection position, the beam L1 is then reflected to travel in another direction.

Figure 6B:
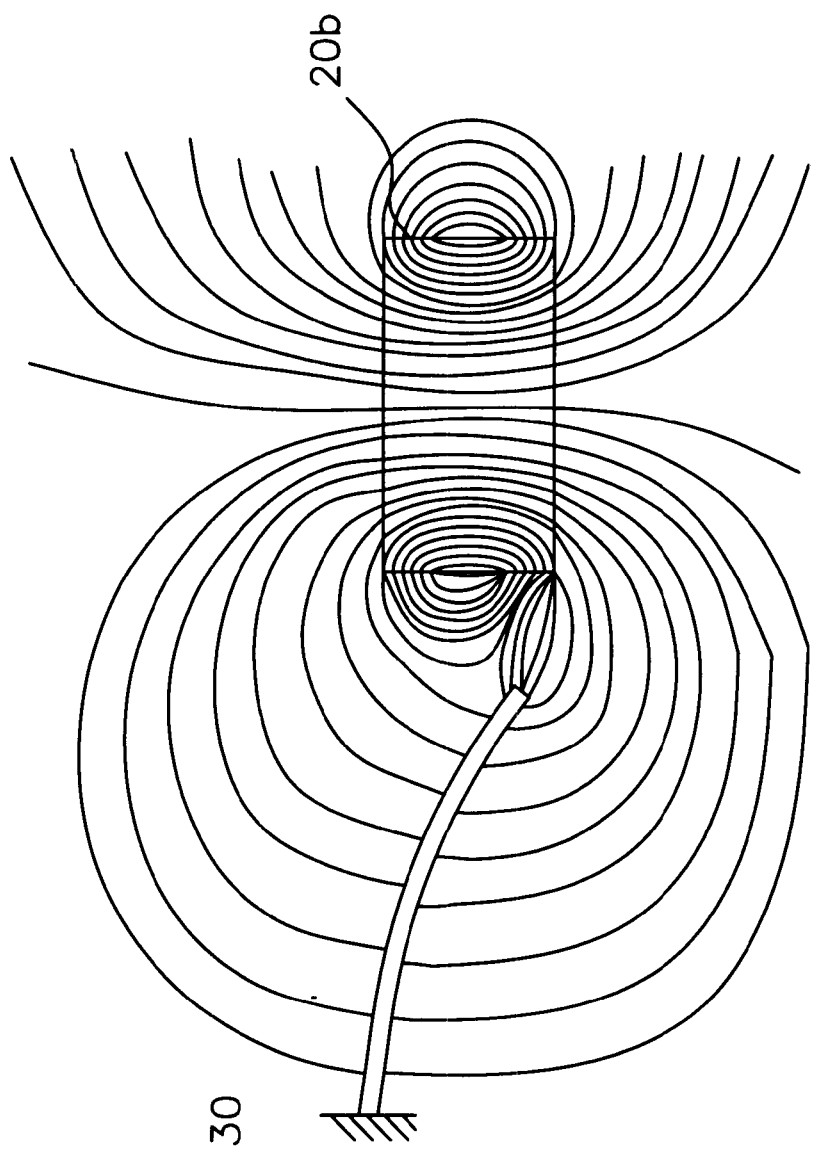

In addition, the driving method of the disclosed rotator 30 can be achieved by a self-driving method. Replacing the rotator 30 with a thermal actuator, a piezoelectric actuator, or an electrostatic actuator can achieve such an effect. However, it is preferable to use the suspended arm design because this driving method does not need any extra coil. Therefore, the number of channels in the optical switch matrix can be largely increased while reducing incorrect actions due to crosstalks. The interactions between the magnetic material on the thermal/piezoelectric/electrostatic actuator at the reflective position and the non-reflective position and the locking magnetic field are shown in FIGS. 6A and 6B.

When the rotator 30 uses the thermal actuator design, both the upper and the lower surfaces are plated with a resistor material or a structural thermal arm. Due to thermal expansion, when a current flows through one of the resistors, the rotator 30 will bend away from the resistor (for example, when a current flows through the resistor on the upper surface of the rotator 30, the rotator 30 bends downward), thus switching the rotator 30 between the reflective and the non-reflective positions.

When the rotator 30 uses the piezoelectric actuator design, one of the upper and lower surfaces or both are plated with a piezoelectric material. The piezoelectric plate gets longer when a current flows through, thus bending the rotator 30 toward the other piezoelectric plate (for example, when a current flows through the piezoelectric plate on the upper surface of the rotator 30, the rotator bends downward). This mechanism switches the rotator 30 between the reflective position and the non-reflective position. Of course, the above switching function can be achieved by either having a bimorph or operating with positive and negative voltages. When the rotator 30 uses the electrostatic actuator design, both its upper and lower surfaces are provided with electrode plates to accomplish the switching function in a similar way.

Furthermore, the optical switch can be made into an optical switch matrix according to practical needs.

Furthermore, the mirror on the rotator could be made by bulk micromachining or by surface micromachining.

Figure 7A:
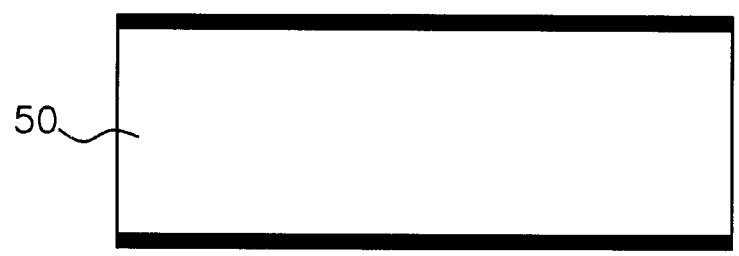
FIGS. 7A through 7F show an example of making the rotator.
Figure 7B:
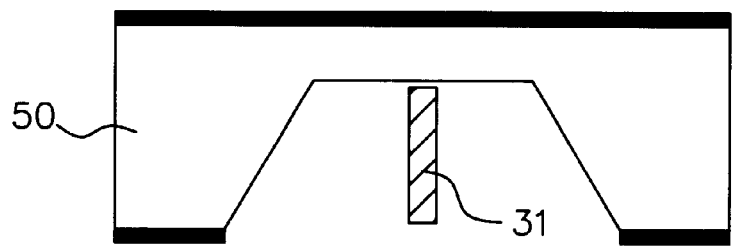
Figure 7C:
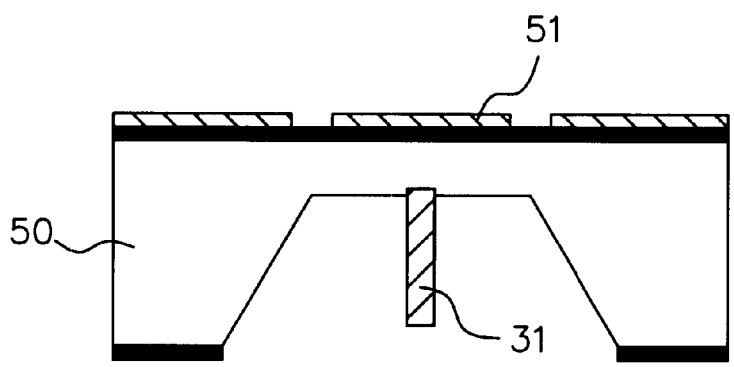
Figure 7D:
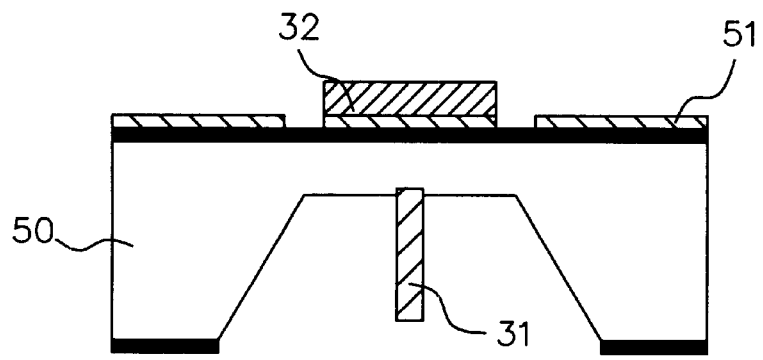
Figure 7E:
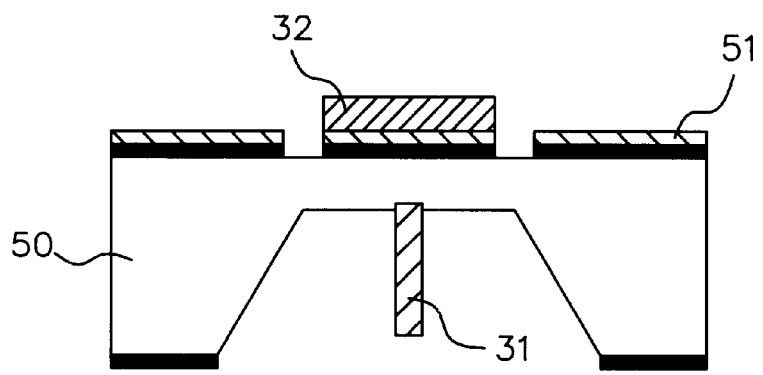
Figure 7F:
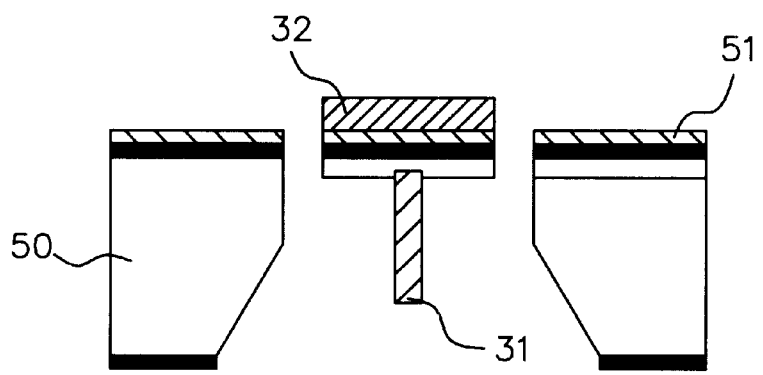

A feasible embodiment is described as follows. When making the disclosed rotator 30 using the MEMS manufacturing procedure, a minute mirror 31 is formed on one surface (FIG. 7B) of a whole silicon substrate 50 (FIG. 7A) by back-etching. Then several portions of the other surface are coated with a conducting layer 51 (FIG. 7C, with one of them corresponding to the mirror 31). Afterwards, a magnetic material 32 is coated onto the conducting layer 51 corresponding to the mirror 31 (FIG. 7D). Finally, its structure is defined as in FIG. 7E and formed by etching procedures (FIG. 7F). The magnetic material 32 and the magnetic object 20b are made on the same surface of the silicon substrate 50.

EFFECTS OF THE INVENTION

The disclosed optical switch can achieve the following effects:

1. The rotator in the invention only needs to rotate a small angle to reflect or pass a beam.
2. The invention is able to quickly stabilize and lock the rotator without friction. Thus, it has a superior dynamical properties and operating lifetime.
3. The invention can be made to be low power consumption. The locking function does not disappear even after the power is turned off. Such an optical switch can be made into a small or normal size.

What is claimed is:

1. An optical switch for selectively reflecting and passing a light beam, which comprises:

a substrate;

a magnetic object installed on one surface of the substrate for providing a magnetic field;

a rotator pivotally installed on the substrate, has a mirror and a magnetic material on its surface, and, under the interactions with the magnetic field, forms two locking potential wells to lock the rotator at a reflection position for reflecting the beam and a non-reflective position for passing the beam; and a driving device installed close to one surface of the substrate corresponding to the rotator for providing a driving force to switch the rotator between the two locking potential wells.

2. The optical switch of claim 1, wherein the driving device is a coil imposed with a current to switch the rotator between the reflective position and the non-reflective position.

3. The optical switch of claim 1 further comprising another magnetic object installed on the other surface of the substrate close to the rotator and opposite to the magnetic object so that the two magnetic objects provide the necessary magnetic field.

4. The optical switch of claim 1, wherein the magnetic object is a magnet.

5. The optical switch of claim 1, wherein the magnetic material and the magnetic object are installed on the rotator by pasting.

6. The optical switch of claim 1, wherein the magnetic material and the magnetic object are installed on the rotator by electroplating.

7. The optical switch of claim 1, wherein the magnetic material and the magnetic object are installed on the rotator by spin coating and etching.

8. The optical switch of claim 1, wherein the magnetic material and the magnetic object are installed on the rotator by half-tone printing.

9. An optical switch for selectively reflecting and passing a light beam, which comprises:

a substrate;

a magnetic object installed on one surface of the substrate for providing a magnetic field; and a rotator pivotally installed on the substrate, has a mirror and a magnetic material on its surface, and, under the interactions with the magnetic field, forms two locking potential wells to lock the rotator at a reflection position for reflecting the beam and a non-reflective position for passing the beam, and provides a driving force for switching between the two positions by itself.

10. The optical switch of claim 9, wherein the rotator is a piezoelectric actuator.

11. The optical switch of claim 9, wherein the rotator is a thermal actuator.

12. The optical switch of claim 9, wherein the rotator is an electrostatic actuator.

* * * * *